(12) United States Patent
Schorn (10) Patent No.: US 11,305,396 B2
(45) Date of Patent: Apr. 19, 2022

(54) DEVICE AND METHOD FOR PROCESSING BRAKE LININGS MOUNTED ON CARRIERS

(71) Applicant: Erlmann GmbH & Co. KG, Herten (DE)

(72) Inventor: Gerd Schorn, Herten (DE)

(73) Assignee: Erlmann GmbH & Co. KG, Herten (DE)

( * ) Notice: Subject to any disclaimer, the term of this patent is extended or adjusted under 35 U.S.C. 154(b) by 220 days.

(21) Appl. No.: 15/566,658

(22) PCT Filed: Mar. 4, 2016

(86) PCT No.: PCT/EP2016/054666
§ 371 (c)(1),
(2) Date: Oct. 13, 2017

(87) PCT Pub. No.: WO2016/169688
PCT Pub. Date: Oct. 27, 2016

(65) Prior Publication Data
US 2018/0111242 A1  Apr. 26, 2018

(30) Foreign Application Priority Data
Apr. 24, 2015  (EP) .................................... 15165049

(51) Int. Cl.
*B24B 19/28* (2006.01)
*B24B 7/06* (2006.01)
(Continued)

(52) U.S. Cl.
CPC .............. *B24B 19/28* (2013.01); *B23Q 7/035* (2013.01); *B24B 5/065* (2013.01); *B24B 7/06* (2013.01);
(Continued)

(58) Field of Classification Search
CPC ........... B24B 5/065; B24B 7/06; B24B 9/002; B24B 19/28; B24B 37/345; B24B 41/005; B23Q 7/03; B23Q 7/035
(Continued)

(56) References Cited

U.S. PATENT DOCUMENTS 3,775,909 A * 12/1973 Best ........................ B23Q 7/02
451/260
3,860,125 A *  1/1975 Johnson ............... B65G 49/064
198/394
(Continued)

FOREIGN PATENT DOCUMENTS

| AT | 000518 U1 | 12/1995 |
|---|---|---|
| DE | 9016405 U1 | 6/1991 |

(Continued)

OTHER PUBLICATIONS

Extended European Search Report dated Nov. 13, 2015; 7pp.
International Preliminary Report on Patentability dated Nov. 2, 2017, 14 pp.

*Primary Examiner* — Eileen P Morgan
(74) *Attorney, Agent, or Firm* — Avyno Law P.C.

(57) ABSTRACT

The invention relates to a device (10) and a method for processing brake pads (44) fitted on pad holders (46), comprising a conveying device (16) for continuous and automatic movement of brake pads (44) to be processed and at least one processing station (12). The conveying device (16) of a device according to the invention (10) comprises several bearing faces, which are driven in a revolving manner by the conveying device (16), for the arrangement of pad holders (46) of the brake pads (44) to be processed and positioning means revolving with the bearing faces, said positioning means counteracting a rotation of the pad holders (46).

9 Claims, 8 Drawing Sheets

(51) Int. Cl.
  *B23Q 7/03* (2006.01)
  *B24B 41/00* (2006.01)
  *B24B 5/06* (2006.01)
  *B24B 37/34* (2012.01)
  *B24B 9/00* (2006.01)

(52) U.S. Cl.
  CPC ............ B24B 9/002 (2013.01); B24B 37/345 (2013.01); B24B 41/005 (2013.01)

(58) Field of Classification Search
  USPC ......................................................... 451/336
  See application file for complete search history.

(56) References Cited

U.S. PATENT DOCUMENTS

| | | | | | |
|---|---|---|---|---|---|
| 4,096,943 | A | * | 6/1978 | Gentsch | B65G 17/12 198/793 |
| 4,149,620 | A | * | 4/1979 | Rosensweig | B23Q 7/035 198/345.2 |
| 4,301,915 | A | * | 11/1981 | Michalik | B65G 17/42 198/851 |
| 4,881,633 | A | * | 11/1989 | Cailey | B23Q 7/035 198/345.1 |
| 5,143,196 | A | * | 9/1992 | Henn | B24B 9/102 198/345.3 |
| 5,426,919 | A | * | 6/1995 | Natterer | B65B 65/00 198/841 |
| 6,110,009 | A | | 8/2000 | Hashimoto et al. | |
| 7,114,607 | B2 | * | 10/2006 | Stone | B23Q 7/1447 198/343.1 |
| 7,347,765 | B2 | * | 3/2008 | Koch | B23Q 7/1405 451/10 |
| 7,416,476 | B2 | | 8/2008 | Yokoyama et al. | |
| 8,924,006 | B2 | * | 12/2014 | Amsden | B25J 15/0052 700/213 |
| 10,309,474 | B2 | * | 6/2019 | Radice | F16D 69/02 |

FOREIGN PATENT DOCUMENTS

| | | |
|---|---|---|
| DE | 9208496 U1 | 9/1992 |
| DE | 29504338 U1 | 7/1995 |
| EP | 1369199 B1 | 4/2006 |
| JP | 09136256 A | 5/1997 |
| KR | 100985964 B1 | 10/2010 |
| KR | 101083933 B1 | 11/2011 |

* cited by examiner

DEVICE AND METHOD FOR PROCESSING BRAKE LININGS MOUNTED ON CARRIERS

The invention relates to a device and a method for processing brake pads fitted on pad holders with a conveying device for the continuous and automated movement of brake pads to be processed and at least one processing station. In the present case, the term fitting should be understood to include in particular also fixing in the sense of gluing and any other joining techniques. In particular, such devices are used in order to give the brake pad an exact, desired dimension after connecting the pad holder and brake pad and to possibly work further on the brake pad, for example, to attach chamfers to edges or introduce grooves or other indentations. In the majority of cases, such devices comprise several processing stations arranged behind one another, such as grinding stations, wherein the conveying device moves the brake pads at a—usually constant—speed through the processing stations. The device is intended in particular for the grinding of brake pads fitted on pad holders, for example disc brake pads of motor vehicles. By continuous and automated processing is meant that the conveying device allows for a large number of brake pads being accommodated, preferably at regular intervals, in order to convey a large number of brake pads through the processing station by means of a revolving conveying device.

From KR 10-1089333 B1, a device is known for processing disc brake pads with several processing stations arranged one behind the other, comprising a conveying device for continuous and automated movement of the brake pads to be processed. For this purpose, the brake pads are arranged on so called "sliding rails", laterally guided between lateral guide rails, which are designated as "side rails", and driven by so-called "pushing bars" from the rear side. In order to hold the brake pads securely on the sliding rails during transport and processing, they are magnetized and held in the direction of the sliding rails using magnetic force.

Another similarly constructed device is described in KR 10-0985964 B1.

The purpose of the invention is to provide a device and a method for processing brake pads which enable reliable, low-maintenance and efficient processing of brake pads fitted on pad holders.

The purpose is achieved by means of a device and method with the features of the independent claims. Further practical embodiments are described in connection with the dependent claims.

In a device according to the invention for processing brake pads fitted on pad holders with at least one processing station, and with a conveying device for the continuous and automated movement of brake pads to be processed in an at least partially linear conveying direction F, the conveying device comprises several bearing faces driven in a revolving manner by the conveying device for arrangement of pad holders of the brake pads to be processed and positioning means which revolve with the bearing faces and which counteract a rotation of the pad holders, in particular about an axis perpendicular to the conveying plane. When conveying in the horizontal direction, the at least one positioning means is intended to counteract a rotation of the brake pads resting on the bearing face about the vertical, i.e., an axis extending in the direction of the gravity force g. A device according to the invention has the advantage that a pad holder resting on a bearing face is secured against rotation by at least one positioning means. In this case, it is not necessary for the at least one positioning means to make a rotation of the pad holder relative to the bearing face impossible. Rather, it is sufficient if, during the intended use of the device according to the invention, a rotation of the pad holder is counteracted, that is, if due to the at least one positioning means, during the intended use, a rotation does not occur, neither during transportation to a processing station nor during processing itself due to the at least one positioning means. For this purpose, it can be taken into account, for example, that forces, which are opposed to the conveying direction F, permanently act in all the processing stations. In this case, the pad holder is, in fact, always pressed against a possibly present rear-side abutment face within the processing stations. The device according to the invention allows for particularly low-friction conveying for the processing of brake pads, since the positioning means are moved with the bearing face and thus, during the processing, no relative movements occur between the pad holders and/or the brake pad on the one hand and the positioning means on the other hand. Preferably, at best small ranges of movement transverse to the conveying direction F within the limits of specifiable dimensional tolerances for compensating production tolerances of the pad holders, for example significantly less than 1 mm, preferably less than 0.5 mm, especially preferably less than 0.1 mm, more preferably a maximum of 0.05 mm and/or only a single movement counter to the conveying direction F, are allowed. The brake pads can be precisely positioned with a device according to the invention and can be efficiently conveyed to the extent that particularly low-friction conveying methods can be used, such as a slide bearing, a ball bearing or a roller bearing transverse to the conveying direction F, in particular, in conjunction with a low-wear, efficient drive in the conveying direction F, such as, a belt or chain drive.

In a further practical embodiment of a device according to the invention, the bearing faces are fixedly connected to separate conveyor belt elements, in particular to trolleys, or to a conveyor belt or are configured on such elements. This has the advantage that the bearing faces can be produced with very high dimensional stability, which allows for a backlash-free or extremely low-backlash bearing arrangement of the pad holders and high manufacturing precision. The bearing faces can be produced in a one-piece design on separate conveyor belt elements or a conveyor belt, in particular by milling.

When the at least one processing station exerts processing forces acting at least partially against the conveying direction F on the brake pads to be processed and the positioning means are configured in such a way that the position of the pad holder on the bearing face during action of the processing forces is explicitly specified by the positioning forces, the positioning means can be designed particularly simply as profiles open on one side which facilitate positioning of the pad holders on the bearing face.

In a further practical embodiment of a device according to the invention, the positioning means comprises at least one rear-side delimiting wall, which extends at least partially transversely to the conveying direction F and extends upwards from the bearing face and serves for bearing on a first reference side face of the pad holder, and has at least two lateral delimiting walls, which extend at least partly in the direction of the conveying direction F and upwards from the bearing face and whose geometries and spacing are adapted to second reference side faces of the pad holder. Such delimiting walls can be produced very precisely and with high dimensional stability, in particular in the case of a one-piece design on a plate element, as a result of which the pad holders can be positioned on the bearing face transversely to the conveying direction F almost free from backlash. It should be pointed out that instead of a reference side face of a pad holder, reference planes clearly defined with the aid of the pad holder can also be used. For example, a reference plane of a pad holder can be defined by two contact points or a contact line extending in the vertical direction of the pad holder. Such a reference plane may, for example, be defined by two outer abutment points on a pad holder, between which extends a concavely shaped region of the pad holder.

In a further practical embodiment of a device according to the invention, the bearing faces and at least the regions between each two adjacent bearing faces (preferably also regions laterally adjacent to the bearing faces) form a closed surface. In this case, a closed belt is formed like a conveyor belt which counteracts the intrusion of dirt occurring in the processing of the brake pads into underlying elements, in particular into drive elements of the conveying device. In this respect, the intrusion of dirt can additionally be countered by air being conveyed, as needed or continuously, outwards from the region of the drive elements within the closed belt (air purge). The term conveyor belt refers in particular to belts which are used as revolving continuous belts. This embodiment can be realized, in particular, by bearing faces being formed or arranged on a belt-like element (this can also be formed in one piece) or by several conveyor belt elements, in particular trolleys, being coupled to form a closed conveyor belt. Elastic elements which are designed and coupled with the conveyor belt elements such that the region between two conveyor belt elements is sealed to counteract the intrusion of dirt into elements arranged under the conveyor belt elements, can be arranged between such conveyor belt elements. Preferably, such elastic elements are designed and arranged in such a way that the regions between two conveyor belt elements remain sealed to one another even when the belt is redirected, in particular twice by 180° around a vertical or horizontal axis, such that a ring-shaped belt guide with two redirections each is produced.

In particular, if the bearing faces are fixedly connected to conveyor belt elements or a conveyor belt, it is preferred to form the bearing faces on—in particular separate—plate elements which are also preferably produced in one piece for the reasons mentioned. Alternatively, the plate elements can also be constructed in several parts as assembly parts. The plate elements can be designed as individual adapter plates, the bearing face of which is matched to a specific type of pad holder, for example with the bearing face being designed complementary to the underside of the pad holder. As described further herein, the bearing face also includes positioning means, which may be one or more positioning elements, projections, stop elements or delimitating walls designed complementary to the reference side faces of the pad holders to maintain the pad holders in place. The use of separate plate elements has the advantage that different plate elements are used on the same trolleys, other conveyor belt elements or conveyor belts, so that only the plate elements have to be exchanged for retrofitting, beyond that, no or only minor changes (e.g. adjustment of the speed) having to be effected on the trolleys, conveyor belt elements or a conveyor belt.

If separate plate elements are provided, which must be connected to other elements of the conveying device, it is particularly preferred for the plate elements and/or the other elements of the conveying device to have coupling elements to connect the plate elements to other elements of the conveying device. Other elements of the conveying device may be, in particular, individual conveyor belt elements, such as, for example, a trolley or a conveyor belt. Quick coupling elements are especially preferred for connecting the plate elements with other elements of the conveying device, which enable reliable and fast relative alignment and fixing of the plate elements to the separate conveyor belt elements or to the conveyor belt. In particular, protruding bolts with corresponding indentations are used as quick coupling elements in combination with latching mechanisms. In this regard, reference is made, in particular, to—for example spring-fitted—latching elements, such as ball studs which engage with corresponding indentations. Such latching mechanisms can establish a non-positive and/or positive connection as viewed in the connecting direction.

For conveying, and optionally also as an element for rotationally secure positioning, of the pad holders, at least one bearing face, at least one stop surface and optional positioning elements by means of which the relative position of the pad holder of the brake pad to be processed with respect to the bearing face is specified, and are formed in one piece on a conveyor belt element, a conveyor belt or a plate element.

A stop surface is formed in a particularly practical embodiment on the side opposite the conveying direction F (rear side), that is, the bearing face is restricted on the rear side by at least one upwardly projecting stop element. In the present case, a stop surface is considered to be preferably a projection extending over part of the width of the pad holder to be conveyed and projecting upwards with respect to the bearing face. Preferably, the stop surface extends over at least 10 percent of the width of the pad holder, more preferably over at least 30 percent and particularly preferably over at least 50 percent. A projection extending over the entire width of the pad holder can also serve as a stop surface. This can either be complementary to the adjoining side of the pad holder or flat.

A stop surface can also be used to bear on any other side of a pad holder if the pad holder is sure to come in contact with the stop surface because of the forces acting on the pad holder and/or with the aid of other means (for example with the aid of tensioning elements, etc.). A pin-like element or several pin-like elements can also serve as a stop surface if the forces exerted by such elements on the pad holder for conveying the pad holder in the conveying direction F do not lead to undesired wear or damage to the pad holder, particularly when during the processing of the brake pad, due to processing, forces act on the brake pad and on the pad holder counter to the conveying direction F, and the resulting counterforce is thus temporarily significantly increased during the conveying in particular cases.

In a further practical embodiment, the bearing faces are each delimited on the rear side by at least one upwardly projecting stop element. Furthermore, to each bearing face at least one positioning element is assigned, by means of which the relative position of the pad holder of the brake pad to be processed with respect to the bearing face is specified. This means that the position of the pad holder is explicitly specified within a narrow tolerance range because of the at least one positioning element, possibly in conjunction with the stop element and/or with further positioning elements. In this regard, reference is made in particular to position tolerances (in particular with regard to a possible displaceability transversely to the conveying direction F) of at most 0.5 mm, preferably at most 0.3 mm, more preferably at most 0.1 mm and particularly preferably at most 0.05 mm.

It is pointed out that a stop element can also be designed as a positioning element, for example by the stop element being designed as a projection opposite the bearing face, the contour of which is complementary to the contour of the rear side of a pad holder. In particular, if this contour is not linear, but has one or more curvatures or changes in direction, in individual cases the result is a clear positioning of the pad holder on the bearing face. This applies in particular to contours which extend over the entire width of the pad holder and especially to those contours which receive the pad holder partially embracing it and/or receive it in a form-fitting manner in the horizontal direction. This means that the positioning elements are designed in such a way that the pad holder can only be inserted into the receiving surface from above and cannot—without lifting it again—be displaced freely without any destruction in the horizontal direction, that is, a horizontal movement—apart from narrow tolerances—is counteracted due to the positioning elements by means of a form fit in the horizontal direction.

In a further practical embodiment of a device according to the invention, a first delimiting wall extending transversely to the conveying direction F and upwardly from the bearing face and at least one second delimiting wall extending in the conveying direction F and upwards from the bearing face are formed at least partially complementary to the pad holder of the brake pad to be processed as positioning elements on at least one bearing face. In this respect, it is particularly preferred for a first delimiting wall to correlate with a first reference side face of a pad holder and for a second delimiting wall to correlate with a second reference side face. The reference side faces are further preferably those surfaces which serve as a basis for the dimensioning of the respective pad holder in the longitudinal and transverse directions. In this case, the result is a particularly precise positioning of the pad holders on the bearing face, since the reference side faces are not subject to production dimensional tolerances.

It is advantageous for the conveying device (in particular arranged below and/or laterally) to comprise guide rails and trolleys fitted in the guide rails. Such trolleys can be precisely manufactured and, in particular, can be moved and driven with low friction in the guide rails by means of slide bearings, roller bearings or ball bearings. It is preferred for the trolleys to comprise means for readjusting their width. In this regard, reference is made in particular to the use and arrangement of rolling bearing elements, which allow an adjustment of the width of the trolleys transversely to the conveying ring F within a tolerance range.

It is particularly advantageous for the trolleys to comprise bearing elements which act in the vertical direction (in particular perpendicular to the conveying plane) and/or in the transverse direction (in particular transversely to the conveying direction). In this case, by means of suitable guide rails and/or adjustable bearing elements, a trolley can be positioned with very little or no play in the vertical direction and in the transverse direction within a guide rail system. This, in turn, allows precise processing of the brake pads, since the zero-point position of a bearing face with respect to the vertical direction and the transverse direction for a plurality of processing stations is precisely fixed, especially in the case of simultaneous support in the vertical direction and in the transverse direction.

The conveying device and any other elements of a device according to the invention can be made exclusively of non-magnetisable material, since magnetic properties are not required. Suitable materials are, in particular, stainless steel materials (so-called VA steels), such as V2A. As a result, magnetization and the adherence of dirt and dust caused it are impossible due to the material used, which further increases process reliability.

The invention also relates to a method for processing brake pads fitted on pad holders, with at least one processing station and a conveying device for revolving conveying of bearing faces in an at least partially linear conveying direction F, according to which a) a pad holder is arranged on a bearing face, wherein, together with the bearing face, positioning means are also arranged in a revolving manner such that the positioning means counteract a rotation of the pad holders with respect to the respective bearing face, b) the bearing face is conveyed together with the pad holder by means of the conveying device through at least one processing station and c) the pad holder is removed in the processed state from the bearing face behind the at least one processing station.

This method permits—regardless of magnetization processes or other measures used to fix the pad holders or brake pads to another element—a safe, low-maintenance and efficient processing of brake pads fitted on pad holders. For this purpose, the pads must only be positioned on the bearing faces, either manually or automatically, and then conveyed by means of the conveying device through the at least one processing station. Contamination of the conveying device can be effectively counteracted both by dispensing with magnetization and by the already mentioned design features on the device. This results in a long service life with long maintenance intervals and thus a low overall maintenance cost. Furthermore, the brake pads can be processed with high precision.

In a further practical embodiment of the method according to the invention, processing forces acting at least partially against the conveying direction F are exerted on the brake pads to be processed by the at least one processing station, the positioning means being designed in such a way that the position of the pad holder on the bearing face, in particular only on application of the processing forces, is explicitly specified on the basis of the positioning means. In this method, the rotation-resistant positioning can be effected by means of a structure which is open on one side, which facilitates the positioning of the pad holders on the bearing face and nevertheless ensures anti-rotation protection.

Further practical embodiments of the invention are described below in connection with the drawings. As shown:

FIG. 14: a schematic representation of the three trolleys from FIG. 13 with bearing faces and elastic intermediate elements in a side view.

Figure 1:
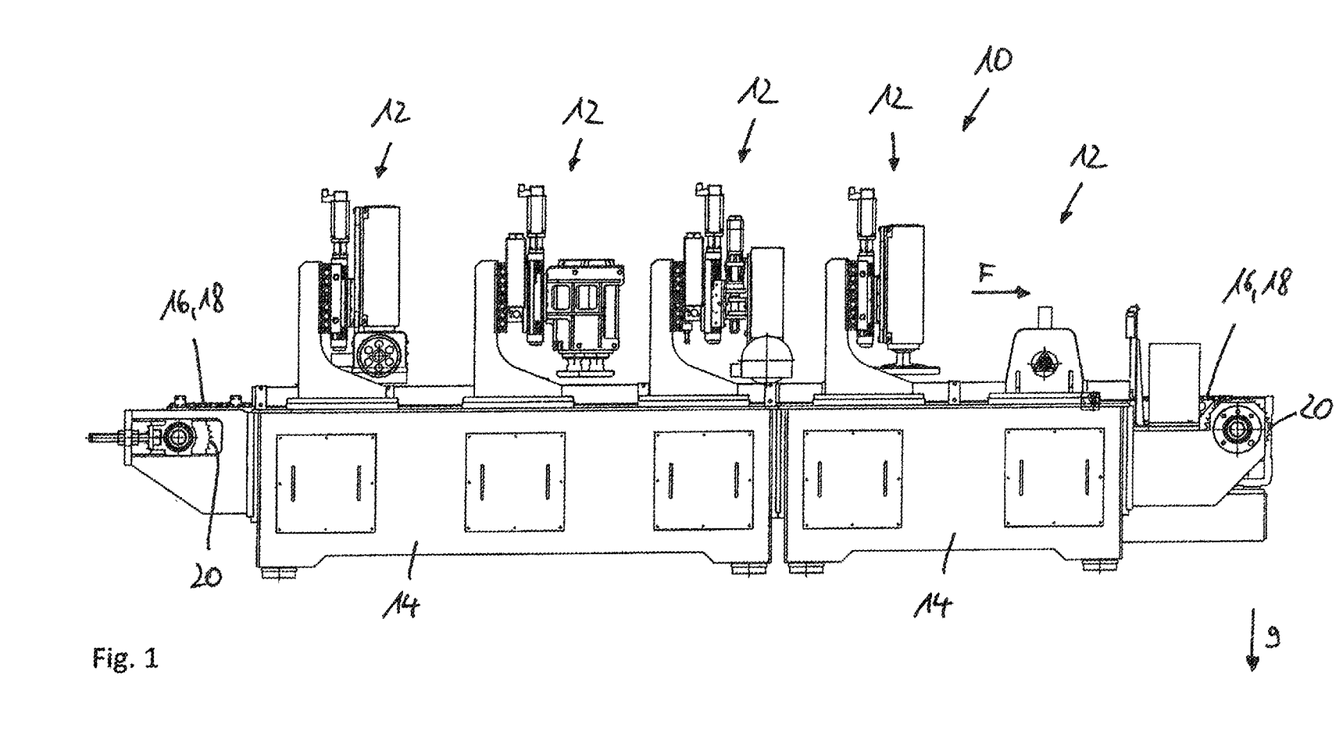
FIG. 1: an embodiment of a device according to the invention in a front view.
Figure 2:
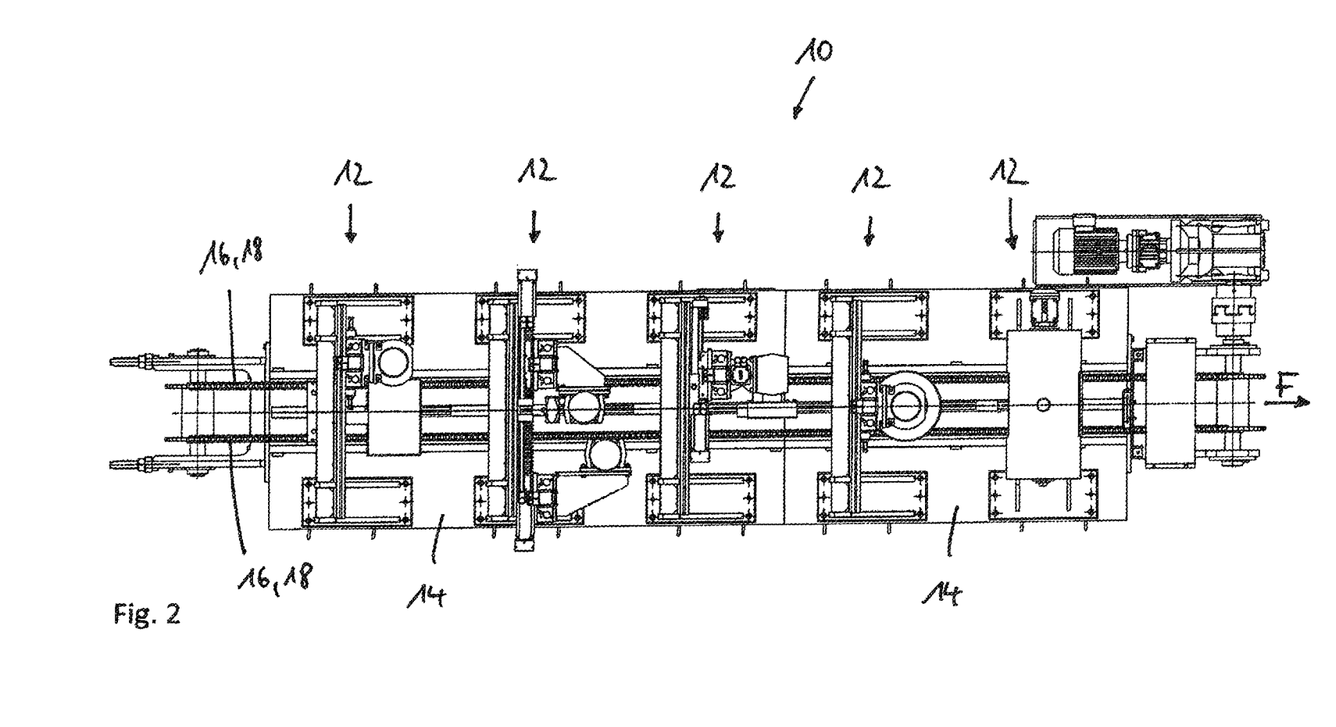
FIG. 2: the device in FIG. 1 viewed from above according to arrow II in FIG. 1, FIG. 3: the device in FIG. 1 in a side view according to arrow III in FIG. 1, FIG. 4: the segment labelled with Z in FIG. 3 in an enlarged view.
Figure 3:
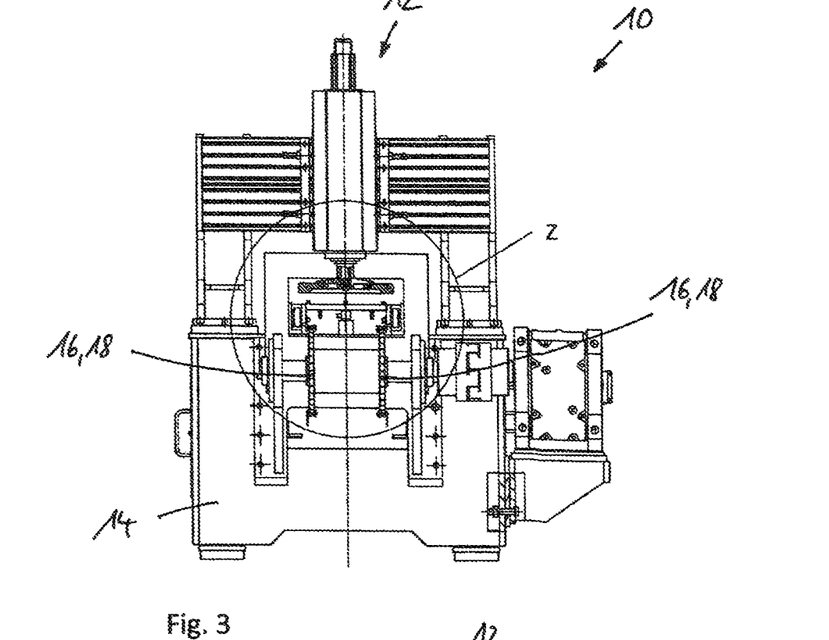

In FIGS. 1-3, a device according to the invention 10 for processing of brake pads 44 fitted on pad holders 46 (in FIGS. 1-3 not shown, see in particular FIG. 5) is shown in different views. As can be seen in particular from FIGS. 1 and 2, the device 10 comprises several processing stations 12 arranged one behind the other in a row. The first three processing stations 12 as well as the fourth and fifth processing station 12 are each arranged on a separate processing table 14. The tables 14 are located on a floor, not shown (preferably flat, horizontally oriented). As part of a conveying device 16, a chain drive is shown in FIGS. 1-3 with two chains 18 running parallel to one another and arranged for revolving, each of which is redirected by 180 degrees by means of two gear wheels 20 arranged at the ends. With the aid of the conveying device 16, in the embodiment shown, trolleys 24 serving as conveyor belt elements 22 are driven in the conveying direction F marked in FIGS. 1 and 2 and conveyed through the processing stations 12 in this direction for processing brake pads 44. The construction of the trolleys 24 is shown in particular in FIGS. 5-12 and will be described in detail below.

In the embodiment shown, the processing stations are a device 10 for pre-grinding (first station), a side grinding station (second station), for example, to attach chamfers in the area of the side edges of the brake pads 44, a station for introducing slots (third station), a station for fine grinding (fourth station), and an optional station for customer-specific special grinding (fifth station). The exemplary embodiment is for illustrative purposes only, in the present case a table 14 with three processing stations and a table 14 with two processing stations having been combined to form a unitary device 10. This results in a modular structure which makes it possible to vary the number of processing stations in a simple manner.

Referring now to FIGS. 5-12, the trolleys 24 serving as conveyor belt elements 22 will first be depicted in detail. The coupling of the trolleys 24 with the chains 18 serving as the drive will then be depicted in conjunction with FIGS. 3 and 4.

Figure 6:
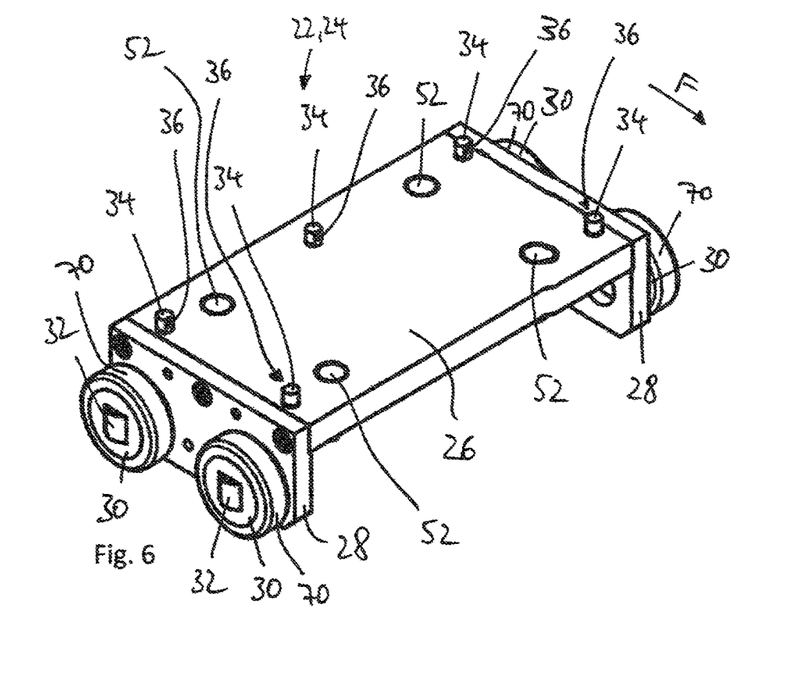
FIG. 6: one of the transport carriages from FIG. 5 without a mounted plate element in a perspective view.
Figure 7:
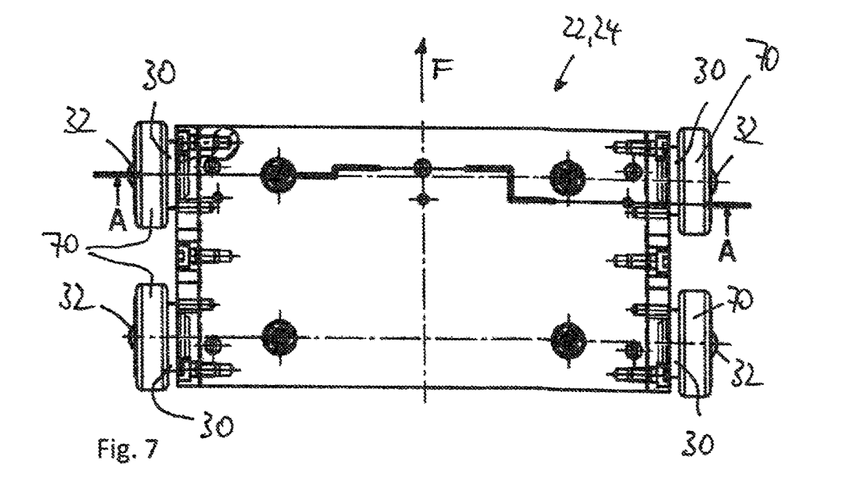
FIG. 7: the transport carriage from FIG. 6 in a view from above.
Figure 8:
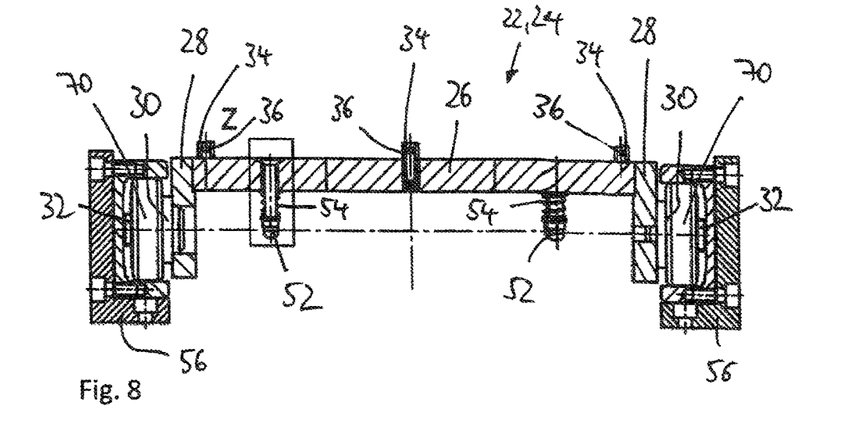
FIG. 8: the transport carriage from FIG. 7 in a sectional view along the section line AA in FIG. 7, FIG. 9: the transport carriage from FIG. 7, inserted in lateral guide rails of the conveying device of a device shown in FIGS. 1-3 in a view according to the arrow IX in FIG. 7, FIG. 10: the transport carriage from FIGS. 6-9 in a front view according to arrow X in FIG. 7, FIG. 11: a portion of the transport carriage from FIGS. 6-10, FIG. 12: a partial sectional view of the area labelled with XII in FIG. 11, FIG. 13: a schematic representation of three trolleys with bearing faces and elastic intermediate elements in a view from above
Figure 9:
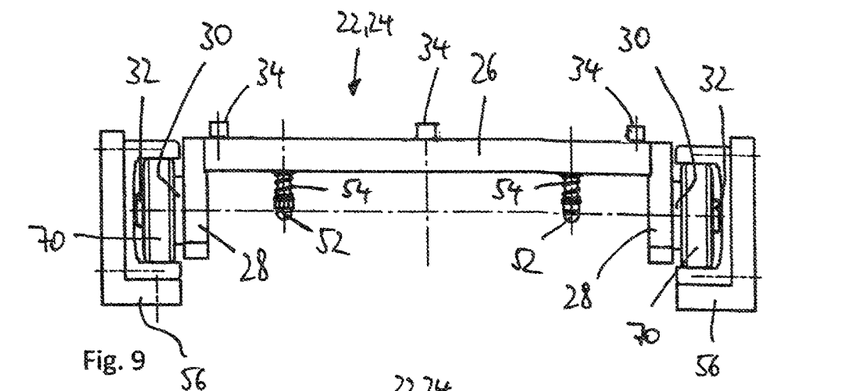
Figure 10:
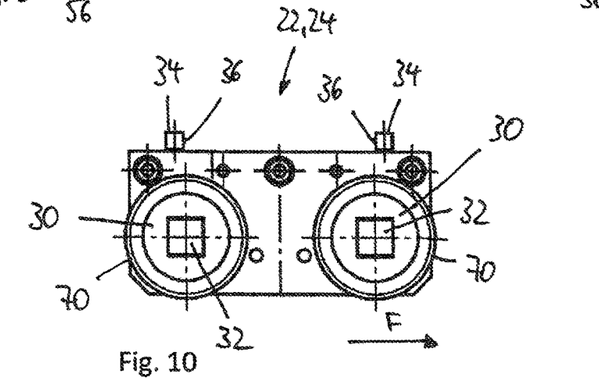
Figure 11:
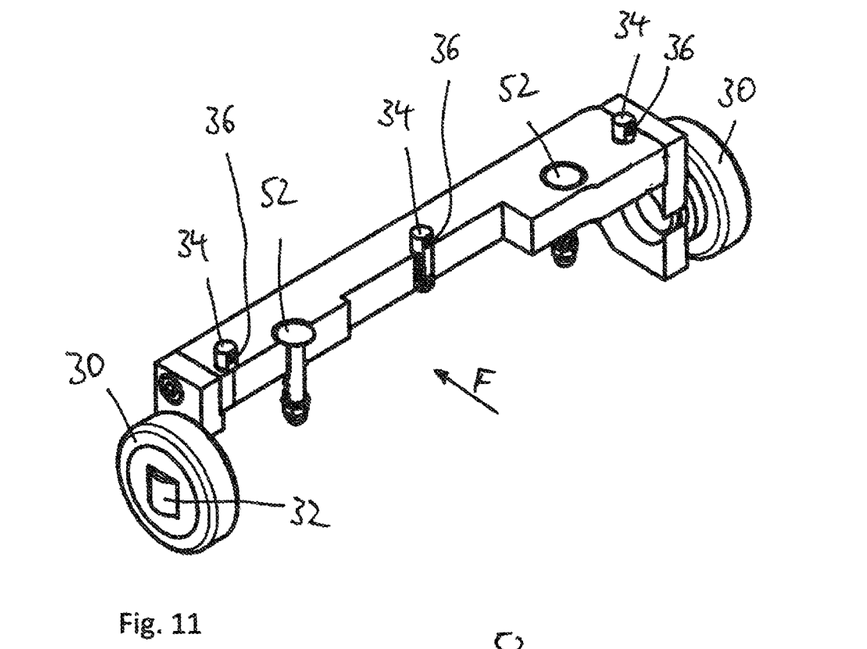

The base structure of a trolley 24 can be seen in FIG. 6. The trolley 24 is essentially composed of the following elements:
 a base plate 26 extending in the horizontal direction,
 side plates 28, which in the embodiment shown are firmly screwed to the base plate 26, and
 on each side plate 28 in each case two roller bearings 30, which are screwed to the side plates 28.

The roller bearings 30 with the laterally prominent roller elements 32, which can be seen in FIGS. 5-10, for receiving forces acting transversely to the conveying direction F and vertically oriented rollers 70 comprise an adjustment facility, not shown in detail, for varying the distance between the lateral roller elements 32 and the side plate 28, to which the respective roller bearing 30 is fastened. This preferably takes place via an adjustment element, such as, for example, an adjusting screw, which is coupled with an off-centre bearing. As a result, the distance of the roller elements 32 can be adapted to lateral guide elements cooperating therewith and a movement occurring in the case of (transverse) forces acting transversely to the conveying direction can be counteracted or the clearance of the trolleys transverse to the conveying direction can be minimized.

Figure 5:
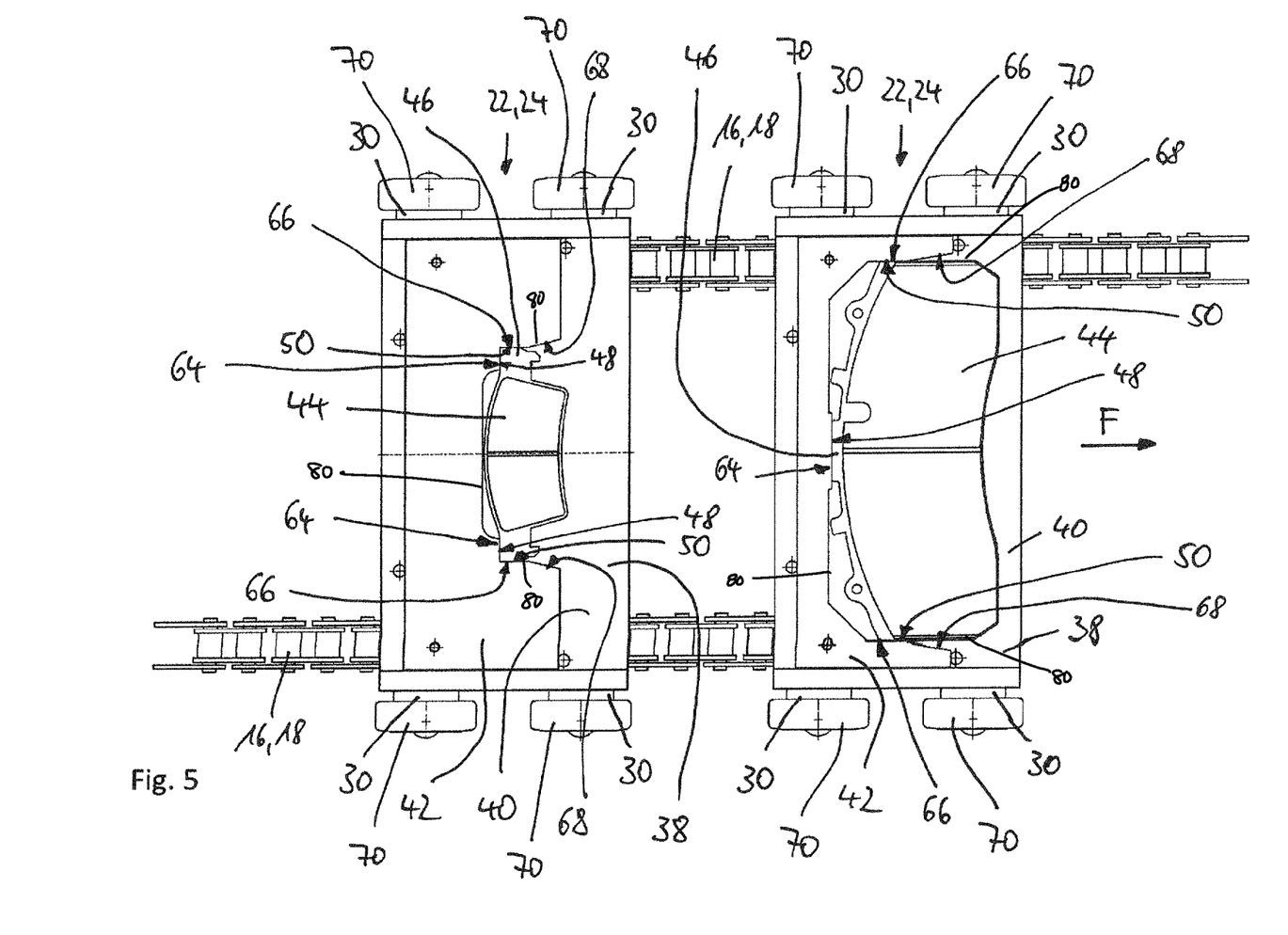
FIG. 5: two transport carriages, each provided with a mounted plate element, each having a receiving surface for a conveying device of the device shown in FIGS. 1-4, wherein a brake pad with pad holder is positioned on each receiving surface.

As can be seen, in particular in FIG. 6, in the embodiment shown, five bolts 34 protruding upwards with respect to the plate surface are arranged on the base plate 26. The bolts each have a flat area on one side which extends in the axial direction of the respective bolt. In the region of the flat areas, ball studs 36 protruding from the flat area are arranged. These are spring-fitted ball elements, which can be pressed inwards against the spring force in the direction of the flat area. The bolts 34 serve to position with respect to a plate element 38 which is to be placed on the base plate 26 and can be designed as shown in FIG. 5. In addition, the ball studs 36 serve as quick coupling elements for establishing a firm connection between a plate element 38 and a base plate 26.

The plate elements 38 shown in FIG. 5 consist, in the embodiments shown (left and right embodiment), each of a lower plate 40 and an upper plate 42, which are fixedly connected to one another. The first plate 40 and the second plate 42 are screwed together or fixedly connected to one another in a different suitable manner. Alternatively, the plate element 38 can also be produced in one piece, in particular by the desired contour being produced by milling from a plate with the thickness of the first plate 40 and the second plate 42.

The plate element 38 comprises a bearing face for the pad holder 46, which is concealed in FIG. 5 by the illustrated brake pads 44 with pad holders 46. The bearing face is understood to mean the surface on which the pad holder 46 rests with its underside.

As can be seen from FIG. 5, the second plate 42 of the plate element 38 is partially adapted to the contour of the respective pad holder 46.

In the trolley 24 shown on the left in FIG. 5, two rear-side delimiting walls 48 are provided on the plate element 38, which extend transversely to the conveying direction F (here: perpendicularly to the conveying direction F) and upwards from the bearing face and are adapted to corresponding rear-side reference side faces 64 of the pad holder 46. Furthermore, two lateral delimiting walls 50 are provided on the plate element 38, which in the embodiment shown extend in the conveying direction F and upwards from the bearing face and are adapted to corresponding lateral reference side faces 66 of the pad holder 46.

In the trolley 24 shown on the right in FIG. 5, only one rear-side delimiting wall 48 is provided, which is adapted to a rear-side reference side face 64 of the pad holder 46. In both the right-hand trolley 24 and the left-hand trolley 24, a structure open to one side is formed by the delimiting walls 48, 50, which structure allows the pad holders to be inserted into the structure from the front. To facilitate insertion, lead-in chamfers 68 are formed on the upper plate 42.

As set forth above, the bearing face also includes positioning means 80, which may be one or more positioning elements, projections, stop elements or delimitating walls designed complementary to the reference side faces of the pad holders to maintain the pad holders in place, as shown and described as 48 and 50 as one example.

The bearing faces which are not visible in FIG. 5 and which are located below the pad holders 46, are of flat design in the embodiment shown. The pad holders 46 also have a rear side of flat design, with which they rest against the bearing faces.

In the embodiments shown in FIG. 5, the bearing faces of the plate elements 38 are adapted to the underside of the pad holders 46. The pad holder 46 arranged on the left-hand trolley 24 has an underside of flat design; the pad holder arranged on the right-hand trolley 24 has a curved underside. Thus, due to the complementary design of the bearing faces, the pad holders 46 are positioned on the bearing faces in a manner not only resistant against rotation about the vertical, but also tilt-resistant.

The plate elements 38 shown in FIG. 5 from above have on their underside five openings (not shown), which are adapted to the five bolts 34 of the base plate 26 shown in FIG. 6 in that the bolts 34 can be guided through the openings and can enter into them. To connect a plate element 38 to the base plate 26, the base plate 26 is positioned such that the bolts 34 can be inserted into the openings formed in the plate element 38. The plate element 38 is then pressed downwards with a sufficiently large force in order to allow for the ball studs 36 to compress and allow for them to decompress again after reaching a nominal position. In the illustrated embodiment, the plate element 38 is securely connected to the base plate 26 when the bolts have entered into the openings, the ball studs 36 have decompressed again. For this purpose, corresponding free spaces in the form of holes can be provided in the openings of the plate element 38 or the plate element 38 is designed in such a way that the bolts with the ball studs 36 completely penetrate a plate of the plate element 38 and the ball studs 36 decompress again above this plate.

In the embodiment shown, the plate element 38, when connected to the base plate 26, comes to bear on the upper side of the base plate 26. In this position, the ball studs 36 within the plate element 38 decompress again in free spaces (not shown) provided within the openings of the first plate 26 so that the plate element 38 is securely supported by the decompressed ball studs 36 opposite the base plate 26. In order to facilitate the release of a plate element 38, four tappets 52 are arranged on the base plate 26 in the embodiment shown. These tappets 52 can be moved upwards along the tappet axis S shown in FIG. 12 in order to release a connection of a plate element 38 with a base plate 26 produced by means of the ball studs 36. For this purpose, a suitable drive element can be provided, for example a pneumatic drive, an electric drive or a drive by means of a cam.

Figure 12:
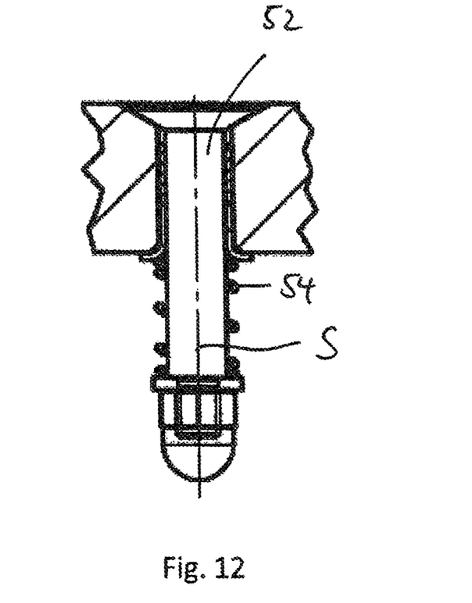

As can be seen in particular in FIG. 12, a spring element 54 is also arranged on the tappet 52 in such a way that the tappet element holds in the preferred position shown in FIG. 6 when it is not driven.

As can be seen in particular in FIGS. 3, 4, 8 and 9, in the illustrated embodiment of a device 10 according to the invention, the trolley 24 is fitted in the region of the roller bearings 30 in C-shaped lateral guide rails 56. Due to gravity, the rollers 70 rest heavily on the lower surfaces of the guide rails 56 (they are additionally pushed downward in the processing stations 12, in particular during grinding processing, from the upper side) and roll with their rollers 70 on the latter. This has the advantage that the zero-point position of all the trolleys 24 in the vertical direction and in the transverse direction is clearly fixed at all processing stations 12. For, on one hand, the distance between the bearing faces and the contact surface of the rollers 70 on the guide rails 56 in the vertical direction is clearly defined and remains constant. And on the other hand, the alignment of the bearing faces with respect to the guide rails 56 can be determined in an accurate manner in the transverse direction, in particular by means of adjustable roller elements 32.

Figure 4:
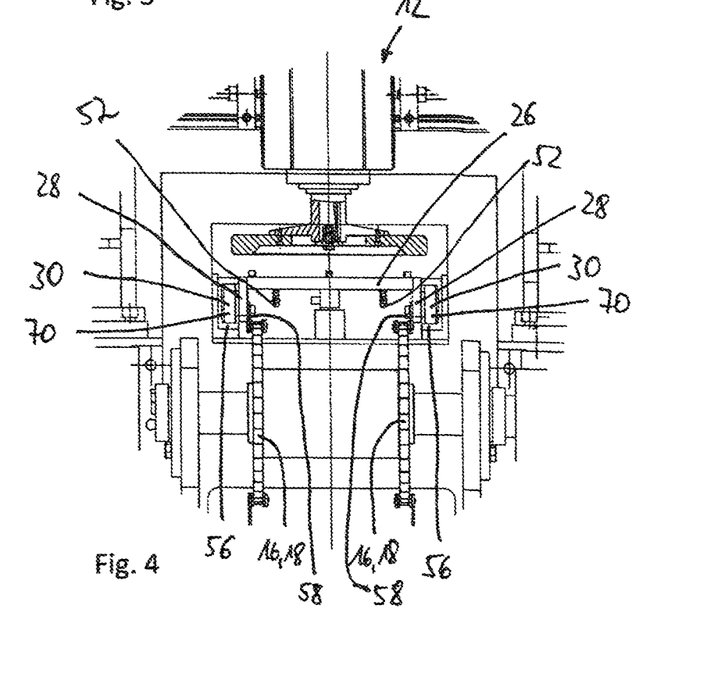

It can also be seen in FIG. 4 that the chains 18 are firmly screwed to the side plates 28 via connecting elements 58. Forces acting in the direction of gravity g as well as forces acting transversely to the conveying direction on the brake pads and/or pad holders, in particular in the area of the processing stations 12, are absorbed with low friction by the lateral guide rails 56 via the rollers 70 (vertical forces) and the roller elements 32 (transverse forces) with simultaneous movement of the trolleys 24.

Figures 13, 14:
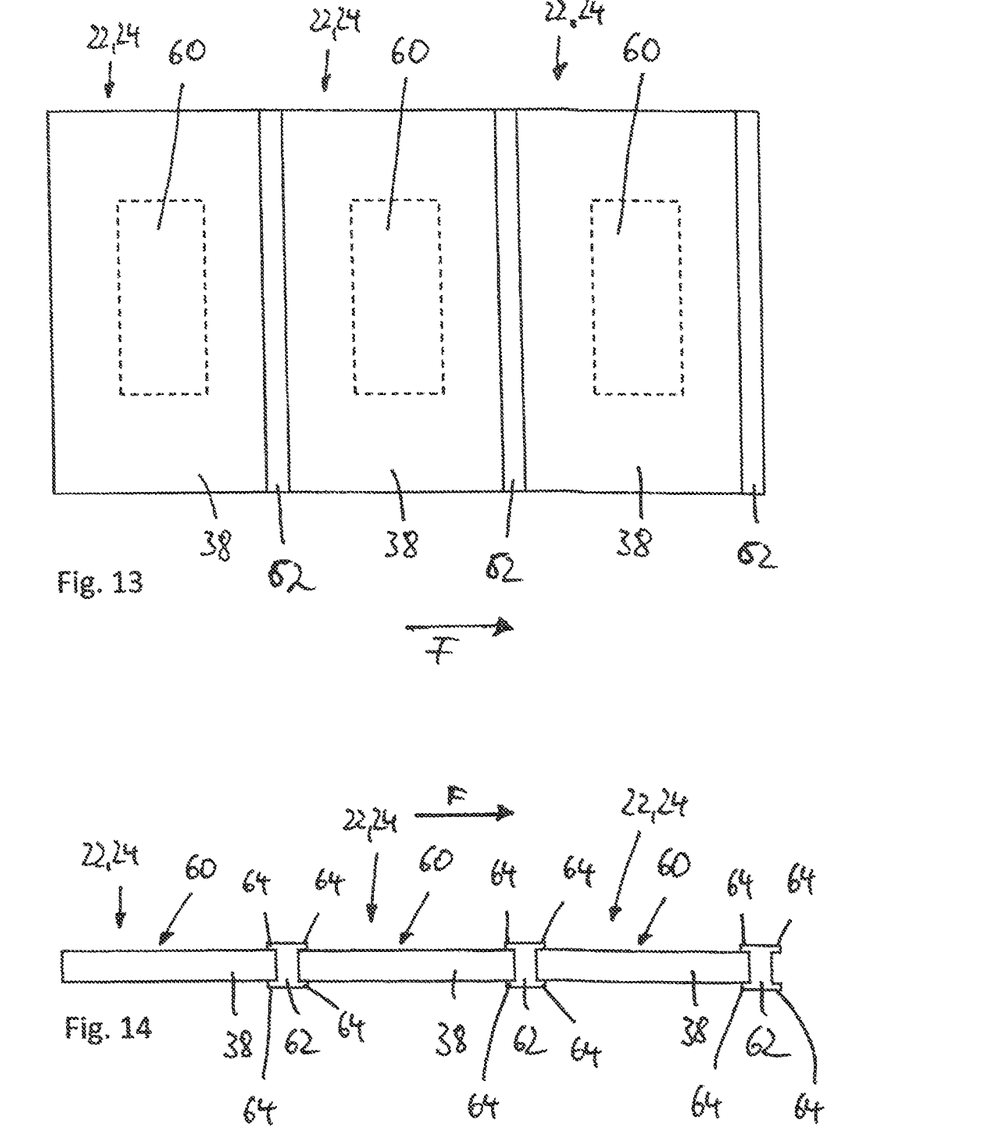

FIGS. 13 and 14 show diagrammatic representations of three plate elements 38 with bearing faces 60, also shown only schematically, which are arranged alternately with elastic intermediate elements 62. FIG. 13 is a top view and FIG. 14 is a side view. The representations are examples. It can be seen that the bearing faces 60 and the regions between two adjacent bearing faces (in this case consisting of the plate elements 38 and the elastic intermediate elements 62), viewed in the conveying direction F, can form a closed surface in the manner of a revolving belt, FIG. 13 showing only three each of the elements of the belt.

In FIG. 14, differences in height and contours of the plate elements 38 are not shown. This figure serves above all to illustrate the design of the elastic intermediate elements 62, which have lip-like projections 64 which cover the plate elements 38 in the peripheral areas. These lip-like elements 64 are well suited for creating an effective seal between two adjacent plate elements 38, also in the regions of redirection of a revolving belt, which cannot be seen in FIGS. 13 and 14.

The features of the invention disclosed in the present specification, in the drawings, as well as in the claims can be essential both individually and in any combination for the realization of the invention in its various embodiments. In particular, reference is made to the following alternative or cumulatively feasible possibilities for designing a device according to the invention:

1. As a positioning means in the sense of the invention, a single projection protruding upwards from the bearing face can serve which engages with an opening formed in the pad holder and complementary to the projection in the case of a pad holder resting on the bearing face. Such a projection can, for example, have a hexagonal shape in order to serve as an anti-rotation device.
2. As a positioning means in the sense of the invention, a delimiting wall or delimiting walls 80 (see FIG. 13) completely or partially surrounding the bearing face can be provided, which extend upwards from lateral edges of the bearing face and are complementary to the side faces of the pad holder to be received. These delimiting walls 80 can be designed in such a way that, after positioning on the bearing face, the pad holder is completely secured against rotation around an axis (in particular a vertical axis) extending perpendicular to the conveying plane, exclusively by means of the delimiting walls.
3. Separate plate elements, in particular adapter plates, can have an overlap in the conveying direction F, and in the direction opposite the conveying direction F, with respect to base plates or other elements of conveyor belt elements (for example, trolleys) which serve to connect the plate elements. This makes it easier to form a closed surface with the plate elements and any intermediate elements.

4. The plate elements, which are rectangular in the exemplary embodiments, can also have different geometries.
5. The height of the delimiting walls corresponds at most to the sum of the height of the pad holder and of the brake pad, preferably at most the height of the pad holder, particularly preferably at most 80 percent of the height of the pad holder.
6. In order to counteract a rotation of the pad holders on the bearing faces, at least one rear-side delimiting wall and two lateral delimiting walls can be arranged U-shaped as positioning elements in the form of a structure open to one side. The delimiting walls may be connected to one another or separated from one another. As viewed in the conveying direction, in front of the lateral delimiting walls, lead-in chamfers which can be removed transversely to the conveying direction can be formed opposite the pad holder to be held.
7. A conveyor belt or individual conveyor belt elements, in particular trolleys, are fitted in the vertical direction and transversely to the conveying direction via a common bearing element or several bearing elements. For this purpose, in particular, roller bearings with a roller which is rotatably fitted around a fixed base body and another bearing element, in particular a roller element, fitted in the base body and laterally protruding are suitable.
8. The intrusion of dirt into an inner region which is enclosed by the revolving bearing faces is counteracted as required or continuously with the aid of air purge exiting from this inner region. With such a measure, contamination of drive elements arranged in the inner region can be effectively counteracted.
9. Bearing elements for trolleys, in particular rollers 70, are preferably accurately matched or adjusted to the height of guide rails 56 in the vertical direction, wherein adjustment possibilities can be provided both on the basis of the guide rails 56 and on the basis of the rollers 70. By accurately, in particular, deviations of considerably less than 1 mm, preferably less than 0.5 mm, particularly preferably less than 0.1 mm, and more preferably at most 0.05 mm, are meant.

LIST OF REFERENCE NUMBERS

10 Device
12 Processing station
14 Table
16 Conveying device
18 Chain
20 Gear wheel
22 Conveyor belt element
24 Trolley
26 Base plate
28 Side plate
30 Roller bearing
32 Roller element
34 Bolt
36 Ball stud
38 Plate element
40 First plate
42 Second plate
44 Brake pad
46 Pad holder
48 Rear-side delimiting wall
50 Lateral delimiting wall
52 Tappet
54 Spring element
56 Guide rail
58 Connecting element
60 Bearing face
62 Intermediate element
64 Rear-side reference side face
66 Lateral reference side face
68 Lead-in chamfer
70 Roller

The invention claimed is:

1. A device for processing one or more brake pads (44) fitted on one or more respective pad holders (46) positioned on a conveying device (16), the device comprising at least one processing station (12) positioned above the conveying device (16), where the conveying device (16) provides continuous movement of the one or more brake pads (44) to be processed by the at least one processing station (12) in a linear conveying direction,
characterized in that
the conveying device (16) comprises: one or more plate elements (38) each having at least one bearing face (60), where the one or more plate elements (38) are secured to and driven by the conveying device (16) for receiving, on the bearing face (60) of the one or more plate elements (38), one or more pad holders (46) of the one or more brake pads (44) to be processed; and positioning means at least partially surrounding the bearing face (60) and extending upward from the plate elements (38) to contact the pad holders (46) when the one or more pad holders (46) are placed on the bearing face (60) of the one or more plate elements (38) to counteract a rotation of the one or more pad holders (46) about an axis extending in the direction of the gravity force with respect to the respective bearing face (60) on the one or more plate elements (38) during processing of the brake pads (44) by the at least one processing station (12) on the conveying device (16).

2. The device according to claim 1, characterized in that the one or more plate elements (38) and the positioning means are fixedly connected to individual conveyor belt elements (22) or a conveyor belt driven by conveying device (16).

3. The device according to claim 1, characterized in that the at least one processing station (12) exerts processing forces acting at least partially counter to the forces of linear conveying direction on the brake pads (44) to be processed and the positioning means are configured such that the position of the pad holder (46) on the bearing face (60) of the plate elements (38) during action of the processing forces is explicitly counteracted by the positioning means.

4. The device according to claim 1, characterized in that the positioning means comprise at least one rear-side delimiting wall (48) that extends at least partially transversely to the linear conveying direction of the brake pads (44) and upwards from the bearing face (60) to contact a first reference side face (64) of at least one of the one or more pad holders (46) and at least two opposing lateral delimiting walls (50) that extend at least partially in the direction of the linear conveying direction of the brake pads (44) and upwards from the bearing face (60) to contact opposing second reference side faces (66) of the pad holder.

5. The device according to claim 2, where the individual conveyor belt elements (22) or conveyor belt driven by conveying device (16) have coupling elements for connecting the plate elements (38) to the individual conveyor belt elements (22) or conveyor belt.

6. The device according to claim 1, characterized in that the positioning means is a at least one positioning element that maintains the relative position of the pad holder (46) of the brake pad (44) to be processed with respect to the bearing face (60) where the at least one positioning means are formed in one piece on the bearing face (60) of the plate element (38).

7. The device according to claim 1, characterized in that the conveying device (16) comprises guide rails (56) and trolleys (24) fitted in the guide rails (56) having at least one chain positioned under and attached to the trolleys (24) to drive the trolleys (24) on the conveying device (16).

8. The device according to claim 7, where the trolleys (24) including bearing elements acting in the vertical direction or in the transverse direction.

9. The device according to claim 1, characterized in that the conveying device (16) is produced from non-magnetisable material.

\* \* \* \* \*